United States Patent [19]

Cuccato et al.

[11] Patent Number: 4,999,912
[45] Date of Patent: Mar. 19, 1991

[54] GLUEING PROCESS OF CYLINDER LINERS TO CRANKCASE OF AN INTERNAL COMBUSTION ENGINE

[75] Inventors: Ubaldo Cuccato; Salvatore Di Carlo, both of Turin, Italy

[73] Assignee: Fiat Auto S.p.A., Turin, Italy

[21] Appl. No.: 882,744

[22] Filed: Jul. 7, 1986

[30] Foreign Application Priority Data

Dec. 5, 1985 [IT] Italy .................. 68020 A/85

[51] Int. Cl.$^5$ .................................. B21D 53/00
[52] U.S. Cl. .................. 29/888.061; 29/458; 29/527.2
[58] Field of Search .......... 29/156.4 WL, 458, 527.2, 29/DIG. 1; 123/193 C; 156/332; 523/176

[56] References Cited

U.S. PATENT DOCUMENTS

| | | | |
|---|---|---|---|
| 359,319 | 3/1887 | Godfrey | 29/DIG. 1 |
| 2,686,091 | 8/1954 | Young | 29/156.4 WL X |
| 3,449,815 | 6/1969 | Jones, Jr. et al. | 29/156.4 WL |
| 4,207,660 | 6/1980 | Rao et al. | 29/156.4 WL |
| 4,234,711 | 11/1980 | Emmons et al. | 156/332 X |

FOREIGN PATENT DOCUMENTS 2140378  2/1973  Fed. Rep. of Germany .

OTHER PUBLICATIONS

Design Engineering, Jun. 1981, p. 15, London, GB; "Cylinder bore distortion reduced by high-strength retainer".

Machinery and Production Engineering, vol. 127, No. 3268, Jul. 23, 1975, p. 88; "Reclaiming diesel engine cylinder blocks with Loctite adhesive".

"Industrial Fasteners Handbook, 1st Edition", pp. 569-570, Trade & Technical Press, Morden, Surrey, GB.

Primary Examiner—Howard N. Goldberg
Assistant Examiner—I. Cuda
Attorney, Agent, or Firm—Sughrue, Mion, Zinn, Macpeak & Seas

[57] ABSTRACT

A glueing process of cylinder liners to the cast iron or aluminium crankcase of an internal combustion engine, regarding either machined or rough cylinder liners, and requiring no tools or fixtures of special type.

1 Claim, 1 Drawing Sheet

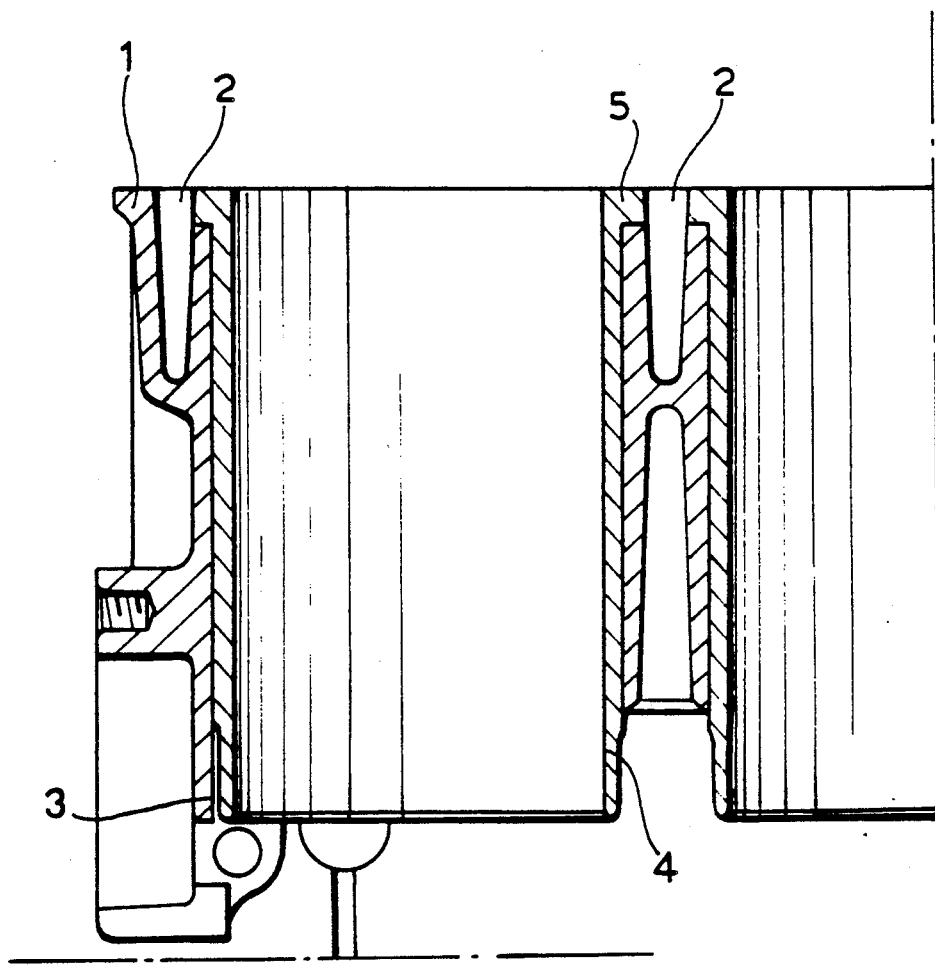

GLUEING PROCESS OF CYLINDER LINERS TO CRANKCASE OF AN INTERNAL COMBUSTION ENGINE

The present invention is related to a working process to get cylinder liners cemented to the crankcase in an internal combustion machine.

The materials employed for cylinder liners are aluminium alloys, cast iron and ceramics, whereas crankcases are made from aluminium and cast iron.

In the current technique, cylinder liners are generally hot shrunk, thus generating internal stresses in the material likely to result in premature wear and removal.

The scope of the present invention is to remove the above defects and improve the production process by reducing working points, in particular reheating furnaces.

The above scope is attained through a cementing process of cylinder liners to the crankcase in an internal combustion engine, involving the following phases:
(a) finishing of the cylinder liner and crankcase surfaces with a max clearance of 1 tenth of a millimiter and a minimum clearance of 2 hundredth of a millimiter between the two parts, and a roughness grade of $Ra=0,8$ to 2;
(b) wetting of cylinder liner and crankcase surfaces designed to come in contact, through anaerobic cement;
(c) insertion of the cylinder liner into the crankcase;
(d) waiting for sealant drying.

Further characteristics and advantages will become clear from the following description referred to the single attached drawing supplied as a way of nonrestrictive example, and made up of a partial sectional view of the invention process object.

With reference to the figure, the reference 1 shows the crankcase of an internal combustion engine with one or more cylinders made, according to needs, from cast iron or aluminium.

The crankcase shown here is provided with passages 2 for coolant circolation and holes 3 to insert the cylinder liners 4 which can be in aluminium alloy, cast iron or ceramics, according to needs.

According to the invention process, the inner area of bore 3 and the outer area of cylinder liners 4 prior to their matching, shall be machined by a diamondset grinder or a standard grinder depending on the material employed, in order to exhibit a roughness grade between $Ra=0.8$ min. and $Ra=2$ max.

The difference between the diameters of the above areas should be no higher than 1 tenth of a millimiter and no less than 2 hundredths of a millimiter.

At this stage, the two parts coming in contact, i.e. the outer area of the cylinder liner 4 and the inner area of the bore 3, will be wetted with a cement having a special anaerobic nature, such as Loctite 640 (T.M.), normally available on the marketplace.

In order to facilitate the insertion of the cylinder liner into the crankcase bore and for a better spreading of the cement, it may be advisable only to wet the upper portion of the cylinder liner and the lower end of the bore.

The positioning of cylinder liner 4 inside bore 3 is facilitated by the rim 5 at the top end of the cylinder liner. The above rim also makes heat dissipation easier.

The final phase of the process consists in the wait for the final cement setting.

It can consist in a very short storage of the piece and anyhow suited to allow for what said above.

The advantage offered by the use of an anaerobic cement is to reduce waiting time remarkably.

The machining of cylinder liner inner area can be made either before or after assembly operation.

What we claim is:
1. A process for glueing a cylinder liner in a cylinder of an internal combustion engine comprising:
   (a) finishing the cylinder liner and crankcase cylinder surfaces with a maximum clearance of 0.1 mm and a minimum clearance of 0.02 mm between the two parts, and with a roughness grade of $Ra=0.8$ minimum and $Ra=2$ maximum;
   (b) wetting said cylinder liner and crankcase cylinder surfaces designed to come in contact with each other with an anaerobic cement;
   (c) inserting the cylinder liner into the crankcase cylinder; and
   (d) drying said cement.

* * * * *